United States Patent [19]

Kierzkowski et al.

[11] Patent Number: 5,529,700
[45] Date of Patent: Jun. 25, 1996

[54] ALGICIDAL OR ALGISTATIC COMPOSITIONS CONTAINING QUATERNARY AMMONIUM POLYMERS

[75] Inventors: David J. Kierzkowski, Milwaukee; Pamela A. Kuske, West Bend, both of Wis.

[73] Assignee: Laporte Water Technologies & Biochem, Inc., Alpharetta, Ga.

[21] Appl. No.: 534,502

[22] Filed: Sep. 27, 1995

[51] Int. Cl.⁶ ...................................................... C02F 1/50
[52] U.S. Cl. ........................... 210/752; 210/764; 422/37; 504/150; 504/155; 504/158; 504/159; 504/161; 252/175; 252/180
[58] Field of Search ..................................... 252/175, 180; 210/764, 749, 755; 422/37; 504/150, 155, 158, 159, 161

[56] References Cited

U.S. PATENT DOCUMENTS

| | | | |
|---|---|---|---|
| 3,738,945 | 6/1973 | Panzer et al. | 260/2 BP |
| 4,111,679 | 9/1978 | Shair et al. | 71/67 |
| 4,113,709 | 9/1978 | Qurnlan | 424/78 |
| 4,506,081 | 3/1985 | Fenyes et al. | 548/523 |
| 4,581,058 | 4/1986 | Fenyes et al. | 71/67 |
| 4,778,813 | 10/1988 | Fenyes et al. | 514/357 |
| 4,995,944 | 2/1991 | Aston et al. | 162/199 |
| 5,015,395 | 5/1991 | Muia et al. | 210/764 |
| 5,096,601 | 3/1992 | Muia et al. | 210/764 |
| 5,128,100 | 7/1992 | Hollis et al. | 210/764 |
| 5,192,451 | 3/1993 | Gill | 210/764 |
| 5,419,897 | 5/1995 | Drake et al. | 424/78.1 |

FOREIGN PATENT DOCUMENTS

1096070 2/1981 Canada.

OTHER PUBLICATIONS

CPS Chemical Co., AGEFLOC WT-POLYMERS. Poly (Dimethl Diallyl Ammonium Chloride), CATIONIC QUARTERNARY AMMONIUM POLYMERS, Bulletin 887–1, CAS No. 26062–79–3.

*Primary Examiner*—Neil McCarthy
*Attorney, Agent, or Firm*—McAndrews, Held & Malloy

[57] ABSTRACT

A composition comprising a water-dispersible ionene polymer and a water-dispersible di-lower-alkyl ammonium halide polymer (for example, a polymer of dimethyl diallyl ammonium chloride) is disclosed. These polymers are present in the composition in a ratio effective to function synergistically as an algistatic or algicidal agent when an effective amount of the composition is dispersed in a body of water. Examples of suitable bodies of water are swimming pools, spas, lakes, rivers, or water in an industrial water system, such as a cooling water system. Also, a method of treating water which is susceptible to the growth of algae is disclosed. The method is carried out by incorporating in the water an at least algistatic amount of the composition.

27 Claims, No Drawings

ALGICIDAL OR ALGISTATIC COMPOSITIONS CONTAINING QUATERNARY AMMONIUM POLYMERS

The present invention relates generally to compositions for stopping algae growth or killing algae in a body of water, and more particularly to such compositions for use in a swimming pool, spa, or other body of water which must be kept nontoxic and otherwise acceptable for human contact.

BACKGROUND OF THE INVENTION

Algae commonly infests and grows in bodies of water, particularly water exposed to the sun or other sources of light. The problem of algae growth affects swimming pools, spas, lakes, rivers, reservoirs, industrial water systems, and other bodies of water.

In swimming pools, algae growth is particularly a problem in the summer, when the water temperature is relatively high and the concentration of nutrients such as nitrate and phosphate in the water increases.

Chemicals have long been added to water to combat the algae problem. Such chemicals are referred to here as "algae control agents" if they either kill algae (i.e. are algicidal) or arrest the growth of algae (i.e. are algistatic) when an effective amount of the chemical in question is dispersed in a body of water.

There are several algae treatment compounds marketed. They include copper, silver, quaternary ammonium compounds, polymeric quaternary ammonium compounds, bromine and chlorine. Each of these types of products has its own strengths and weaknesses. Copper and silver kill algae fast, and at low levels, but they can cause staining of the surfaces as well as discoloration of the water if used incorrectly. Quaternary ammonium compounds kill algae and are inexpensive, but they cause foaming and their effectiveness is fairly short lived in a pool. Polymeric quaternary ammonium algicides do not foam or cause staining, but in order to kill algae, high levels must be added. Chlorine and bromine are both capable of killing algae, but the levels required are high and no one can use the pool until chemical levels are returned to normal.

Ionenes have been suggested for use as microbiocides for the microorganisms, including algae, which grow in industrial water systems. See, for example, U.S. Pat. No. 4,506,081, column 4, lines 15–35, and column 10, lines 16–68; U.S. Pat. No. 5,419,897, column 2, lines 5–20. Ionenes are polymeric quaternary ammonium compounds having the structures and properties and made by the processes specified in U.S. Pat. Nos. 4,506,081; 4,778,813; 4,581,058; and 5,419,897; which are incorporated here by reference in their entireties for their disclosure of ionenes.

Water-dispersible di-lower-alkyl ammonium halide polymers such as poly (dimethyl diallyl ammonium chloride) function as coagulants, and some of them (AGEFLOC WT-20 and W-40) have been identified by the manufacturer as being EPA approved for use as water clarifying agents in potable water and waste water.

OBJECTS OF THE INVENTION

An object of the invention is to make ionenes more effective algae control agents.

Another object of the invention is to provide an effective algae control agent which is nontoxic to humans and thus suitable for use in swimming pools, spas, and other bodies of water entered by humans.

One or more of the preceding objects, or one or more other objects which will become plain upon consideration of the present specification, are satisfied by the invention described here.

SUMMARY OF THE INVENTION one aspect of the invention is a composition comprising a water-dispersible ionene polymer and a water-dispersible di-lower-alkyl ammonium halide polymer. These polymers are present in the composition in a ratio effective to function as a synergistic algae control agent in a body of water.

Another aspect of the invention is a method of treating water which is susceptible to the growth of algae by incorporating in the water an at least algistatic amount of the algae control composition defined above.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The present compositions comprise a water-dispersible ionene polymer and a water-dispersible di-lower-alkyl ammonium halide polymer, optionally dissolved in at least enough water to form a solution.

The structures of ionene polymers are defined in the patents incorporated by reference above.

One ionene contemplated for use here has the molecular formula:

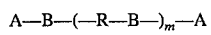

In this formula, m is a number from 0 to about 100.

Each A moiety in the above ionene formula is selected from the moieties defined in column 1, lines 15–60, of U.S. Pat. No. 4,581,058. At least one A moiety contemplated here is the last structure on line 25, column 1, of U.S. Pat. No. 4,581,058.

Each R moiety in the above ionene formula is selected from the moieties defined in column 1, lines 15–60, of U.S. Pat. No. 4,581,058. One R moiety contemplated here is the last structure on line 15, column 1 of U.S. Pat. No. 4,581,058, which includes a Q moiety. Two Q moieties expressly contemplated here are:

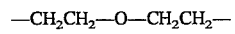

and

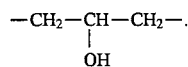

Each B moiety in the ionenes contemplated here can be a linkage having the structure:

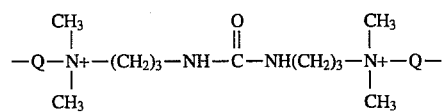

In the latter structure, each Q moiety is independently selected from the respective Q moieties defined in column 1, lines 41–60, of U.S. Pat. No. 4,581,058.

In one contemplated ionene polymer, one A moiety is chlorine; the other A moiety is the last structure on line 25, column 1 of U.S. Pat. No. 4,581,058; each R moiety is the last structure on line 15, column 1 of U.S. Pat. No. 4,581,058; and each Q moiety is:

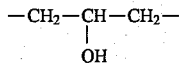

In another contemplated ionene polymer, one A moiety is chlorine; the other A moiety is the last structure on line 25, column 1 of U.S. Pat. No. 4,581,058; each R moiety is the last structure on line 15, column 1 of U.S. Pat. No. 4,581,058; and each Q moiety is $-CH_2CH_2-O-CH_2CH_2-$.

The ionene polymers contemplated here may have a molecular weight of from about 2000 to about 15,000 amu.

Several examples of commercial ionene polymers contemplated for the present use are those prepared by Buckman Laboratories International, Inc., Memphis, Tenn., as NC-2660, NC-2590, and BL-1090. ("BL" is a registered trademark of Buckman Laboratories.) The NC-2660 ionene polymer is understood to have the following structure:

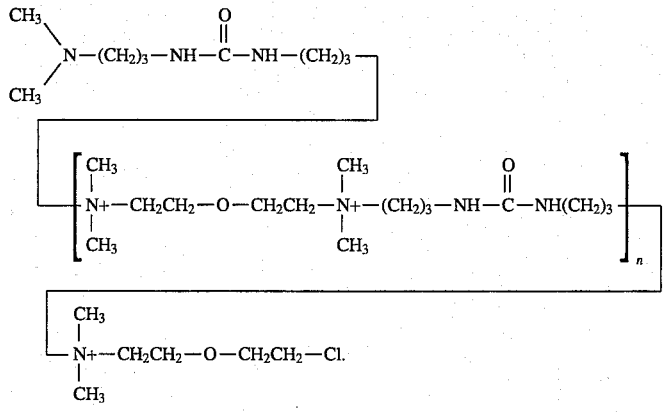

The NC-2590 and BL-1090 ionene polymers are understood to have the following structure:

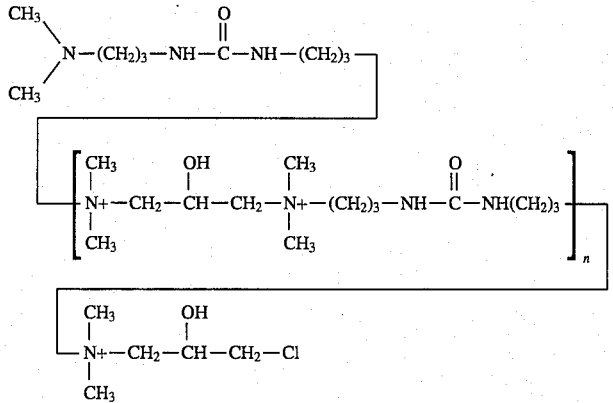

where n is from 0 to about 100 in each instance. The BL-1090 polymer is believed to have an average molecular weight of 2,000–15,000 amu, or alternatively 3,000–7,000 amu. The other polymers are understood to have comparable molecular weights. All other ionene polymers known to or found to have at least algistatic properties in any useful proportion are also contemplated for use in the present invention.

The water-dispersible di-lower-alkyl ammonium halide polymers useful here are broadly defined in U.S. Pat. Nos. 4,995,944 (issued Feb. 26, 1991 to Aston, et. al.); and U.S. Pat. No. 3,738,945 (issued Jun. 12, 1973, to Panzer et al.). The latter two patents are incorporated here by reference for their description of water-dispersible di-lower-alkyl ammonium halide polymers.

The di-lower-alkyl ammonium halide polymers contemplated here include those made by reacting dimethylamine, diethylamine, or methylethylamine, preferably either dimethylamine or diethylamine, with an epihalohydrin, preferably epichlorohydrin. Polymers of this type are disclosed in U.S. Pat. No. 3,738,945 and Canadian Pat. No. 1,096,070, which are incorporated here in their entirety. These di-lower-alkyl ammonium halide polymers have the following repeating structure:

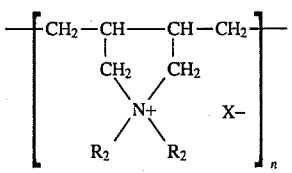

and the terminal groups provided by the reactants (which are believed to be di-lower alkylamine, halide, and/or hydroxyl terminal groups). In the latter formula, n is a number between about 10 and about 1000, alternatively from about 18 to about 700. The polymers contemplated here include those having a molecular weight between about 20,000 and about 100,000 amu.

Each $R_2$ is independently selected from methyl and ethyl. A structure in which each $R_2$ is a methyl group is one alternative contemplated here.

X is a halide ion, specifically, a chloride, bromide, fluoride, or iodide ion. A chloride ion is specifically contemplated here as one option.

The di-lower-alkyl ammonium halide polymers contemplated here include those sold by CPS Chemical Co., Inc., West Memphis, Ark., under the trademarks AGEFLOC WT50SLV (having a molecular weight of about 3,000 amu, "n" in the above formula is about 18); AGEFLOC WT40 (having a molecular weight of about 21,000 amu, n is about 130); AGEFLOC WT20VHV (having a molecular weight of about 60,000, n is about 371); AGEFLOC WT2206 (having a molecular weight of about 90,000, n is about 557); and higher polymers having molecular weights of 150,000, 200,000, or more. The inventors presently contemplate that the higher molecular weight polymers are most useful for the present purpose.

The water-dispersible ionene polymer and the water-dispersible di-lower-alkyl ammonium halide polymer are provided in a ratio effective to function as a synergistic algae control agent when an at least algistatic concentration of the composition is dispersed in a body of water. The ratio of the first compound to the second compound contemplated here may be from about 1:10 to about 10:1, alternatively from about 0.5:1 to about 10:1; alternatively from about 1:1 to about 3:1. These two components may be provided as a single composition or in separate compositions which are combined or added independently at the point of use.

The present composition may also contain other materials of any kind which do not prevent its use as an algistatic or algicidal agent. For example, dyes, pH control agents, fragrances, additional algistatic or algicidal materials, water or other diluents, solubilizers, and other like or different materials may be incorporated in the present compositions without departing from the present invention.

The present composition can be used by dispersing it at an algistatic and/or algicidal concentration in water. An algistatic concentration is an amount effective to at least stop the growth of at least some species of algae. An "at least algistatic" concentration as defined here includes a concentration as great as or greater than the minimum algistatic concentration. An "at least algistatic" composition is regarded here as including a concentration great enough to be algicidal.

The amount of the composition required to be at least algistatic or algicidal will vary with different concentrations, species, or strains of algae, different water temperatures, different water nutrient levels, the selected ingredients and their ratios, and other factors. But the amount of the composition required to provide an "at least algistatic amount" or an algicidal amount in a given instance can readily be determined by experimenting under the specific conditions in question. Empirical testing to find the minimum algistatic or algicidal concentration of the present compositions is routine in this field, and is demonstrated in the working examples presented below.

The present compositions can either include or exclude the body of water which is to be protected from or depleted of algae. Compositions including the protected water can be regarded as dilute or "as-used" compositions, while compositions excluding most or all of the protected water can be regarded as concentrated or "as-sold" compositions. An exemplary concentrated composition is one containing from about 1% to 100% by weight of the combined ionene polymer and di-lower alkyl ammonium chloride polymer, optionally dissolved in water. An exemplary dilute composition is the combination of an ionene polymer and a dialkyl ammonium chloride polymer as defined above, dispersed at a concentration from about 0.05 to about 100 ppm, alternatively from about 0.1 to about 10 ppm by weight in water.

An algae control composition is defined herein as "synergistic" if the minimum algicidal concentration of the composition is less than one would predict from the minimum algicidal concentrations and ratio of its ingredients.

The predicted minimum algicidal concentration of the composition is determined by multiplying the weight fraction of each ingredient by its minimum algicidal concentration, used alone. Then these results for each ingredient are added together. That sum is the expected minimum algicidal concentration.

Thus, if component A has a minimum algicidal concentration of 3 ppm when used alone, component B has a minimum algicidal concentration of 5 ppm when used alone, and they are combined in a 2:1 ratio, the weight fraction of component A is 0.667 and the weight fraction of component B is 0.333. The predicted algicidal concentration is thus:

$(.667 A) (3 ppm A) + (.333 B) (5 ppm B)$ = 2 ppm + 1.66 ppm
= 3.66 ppm

If the actual minimum algicidal concentration of the composition is less than 3.66 ppm, then the composition is a synergistic algicidal composition.

A similar calculation is used to determine whether a composition is a synergistic algistatic composition. A composition which is either a synergistic algicidal or synergistic algistatic agent is defined as a synergistic algae control agent for the present purposes.

The present invention also includes a method of treating water which is susceptible to the growth of algae. This method is carried out by providing and incorporating in a body of water an at least algistatic amount of the combination of an ionene polymer and a dimethyl ammonium chloride polymer as defined above.

WORKING EXAMPLES

The following examples illustrate how the present invention may be carried out.
Test Procedure
Allen's algal culture medium (literature reference: Allen, M. B., The Cultivation of Myxophyceae, Arch. Mikrobiol., 17:34–53 (1952)) was used to carry out algal growth experiments. Allen's medium is an aqueous solution of the following salts (the weights of which are anhydrous weights unless water of hydration is indicated) in distilled water:

| ALLEN'S MEDIUM | |
|---|---|
| Salt | mg/L |
| $NH_4Cl$ | 50 |
| $NaNO_3$ | 1000 |
| $KNO_3$ | — |
| $KH_2PO_4$ | — |
| $K_2HPO_4$ | 250 |
| $MgCl_2$ | — |
| $MgSO_4.7H_2O$ | 513 |
| $CaCl_2.2H_2O$ | 66 |
| Fe Citrate | — |
| $FeCl_3$ | 3 |
| $Fe_2(SO_4)_3$ | — |
| $Na_2SiO_3.9H_2O$ | — |
| $Na_2CO_3$ | — |
| Citric Acid | — |
| Na Citrate | — |
| EDTA | — |

The ions contained in Allen's medium are as follows:

| Ions | mg/mL |
|---|---|
| N | 178 |
| P | 45 |
| Fe | 1 |
| Mg | 50 |
| Ca | 18 |
| S | 67 |
| K | 112 |

The algal stock culture was *Chlorella pyrenoidosa* green algae (Wis. 2005). The stock culture was incubated and maintained in 250 ml of Allen's medium in a 500 ml Erlenmeyer flask under uniform light and temperature conditions.

About a week before an algae culture was used in a test, a fresh stock culture was made up using 10 ml of the standard culture and 250 ml of Allen's medium in a 500 ml Erlenmeyer flask to ensure a vigorous inoculum.

The stock culture density was determined by measuring the absorbance of the culture in a colorimeter, using a 1 cm cell and a wavelength of 600 nm. The benchmark stock culture density (7,500,000 cells per 100 ml) was present if the absorbance of the culture was 0.1. If the absorbance initially was greater than 0.1, the stock culture was normalized to the benchmark density by diluting it with Allen's medium. If the absorbance initially was less than 0.1, the culture was allowed to incubate longer.

To carry out a test for algistatic/algicidal activity, 25 ml of sterile Allen's medium, 1.0 ml of a normalized stock culture, and 1 ml of a solution of the proposed algicidal/algistatic agent (provided at a concentration calculated to provide the final concentration of the agent reported in the results) were placed in a 50 ml Erlenmeyer flask to make up a primary culture. The flask was incubated at 22°–25° C. in the presence of lamps rated at 100–400 foot candles of light for 24 hours.

One ml of the primary culture was then subcultured into a second 50 ml Erlenmeyer flask containing 25 ml of Allen's medium, then both the main culture and the subculture flasks were incubated for 14 additional days.

This test was run using a range of different final concentrations of each agent being tested in separate flasks.

The presence or absence of growth in each primary and subculture flask was determined visually. A given agent at a given concentration was reported to be algicidal only if the algae did not grow either in the primary culture flask or in the subculture flask. A given agent at a given concentration was reported to be algistatic only if the algae did not grow in the primary culture flask.

Finally, the results obtained using different concentrations of the same agent were compared. The most dilute concentration which proved to be algistatic was reported as the algistatic concentration. The most dilute agent concentration which proved to be algicidal was reported as the algicidal concentration.

Example 1

Using the above procedure, NC-2660 ionene, Agefloc WT-40 di-lower alkyl ammonium chloride (polyDMDAC), and a 1:1 mixture of the two were tested for algistatic and algicidal efficacy. The results are found in Table 1. Based on the algistatic and algicidal levels of the NC-2660 and the Agefloc WT-40, minimum effective algistatic and algicidal concentrations of 2.0 and 4.0 ppm, respectively, would be expected. The data, however, shows a synergistic algistatic test concentration of 0.6 ppm (0.3 ppm NC-2660, 0.3 ppm Agefloc WT-40) and a synergistic algicidal test concentration of 2 ppm (1 ppm NC-2660, 1 ppm Agefloc WT-40). This synergism was surprising.

Example 2

Using the same procedure, the BL-1090 ionene, NC-2590 ionene, and Agefloc WT-40 polyDMDAC were tested along with 1:1 ratios of the ionenes with the Agefloc WT-40 polyDMDAC. The results were located in Table 2. Here synergistic effects are mixed. With the BL-1090 ionene, there is no synergy seen as algicides. As algistats, unexpected synergy is seen. NC-2590 ionene is not synergistic as an algistat, but there is unexpected synergy as an algicidal blend.

Example 3

Once it was determined that the use of BL-1090 ionene and Agefloc WT-40 polyDMDAC were unexpectedly synergistic (example 2), tests to determine the optimal ratios were conducted. These experiments used the same procedure as mentioned above. The experiments were conducted using the BL-1090 ionene and Agefloc WT-40 polyDMDAC at several different weight ratios. Results are located in Table 3. As the data clearly show, the most efficacious ratios of BL-1090:Agefloc WT-40 are 3:1 and 2:1.

Example 4

An experiment was conducted to determine if other polyDMDACs have the same effect as the Agefloc WT-40. The same procedure as mentioned above was used. The results are located in Table 4. As seen, all of the polyDMDACs tested have a similar effect on the efficacy of the BL-1090. The polyDMDACs having the greatest molecular weight (WT20VHV, and WT2206) showed the greatest synergy.

Example 5

A test was set up to verify the synergy between the ionenes and the polyDMDACs. Once all the data had been collected to determine the most efficacious mixtures, the following experiment was conducted to determine if the synergy holds for another of the ionenes, (NC-2590). Table 5 lists the results. The algistatic levels for the NC-2690 and the Agefloc WT20VHV were 0.6 ppm and 1.4 ppm respectively. This would give an anticipated result of 0.8 ppm, yet the result seen was 0.6 ppm. As part of the experiment, the other polyDMDACs were tested.

It is apparent that the ionenes have synergistic tendencies when formulated with polyDMDACs. It is hypothesized that the polyDMDACs act to wet the algae cells and allow the ionenes to penetrate the cell more effectively. This is however only speculation.

We therefore have discovered a novel algicide that is non-foaming, non-staining and has efficacy at low levels. In short, when combining an ionene with a polyDMDAC, the result is an improved algistat/algicide.

TABLE 1

| Agent Composition | Algistatic Level (ppm) | Algicidal Level (ppm) |
|---|---|---|
| Agefloc Wt-40 | 2 | 5 |
| NC-2660 | 2 | 3 |
| NC-2660:Agefloc WT-40 (1:1) | 0.6 | 2.0 |

TABLE 2

| Agent Composition | Algistatic Level (ppm) | Algicidal Level (ppm) |
|---|---|---|
| BL-1090 | 0.6 | 5 |
| BL-1090:Agefloc WT-40 (1:1) | 0.6 | 5 |
| Agefloc WT-40 | 1.0 | 5 |
| NC-2590:Agefloc WT-40 (1:1) | 1.0 | 2 |
| NC-2590 | 0.6 | 2 |

TABLE 3

| Agent Composition Ratio (BL-1090:Agefloc WT-40) | Algistatic Level (ppm) | Algicidal Level (ppm) |
|---|---|---|
| 1:1 | 0.8 | >2 |
| 3:1 | 0.6 | 2 |
| 1:3 | 0.8 | >2 |
| 2:1 | 0.6 | 2 |
| 1:2 | 0.8 | 2 |

TABLE 4

| Agent Composition | Algistatic Level (ppm) | Algicidal Level (ppm) |
|---|---|---|
| BL-1090:Agefloc WT-40 (3:1) | 0.6 | >2 |
| BL-1090:Agefloc WT2206 (3:1) | 0.5 | 1.0 |
| BL-1090:Agefloc WT50SLV (3:1) | 0.6 | 2.0 |
| BL-1090:Agefloc WT20VHV (3:1) | 0.4 | 1.0 |

TABLE 5

| Agent Composition | Algistatic Level (ppm) | Algicidal Level (ppm) |
|---|---|---|
| NC-2590:Agefloc WT-40 (3:1) | 0.4 | >3 |

TABLE 5-continued

| Agent Composition | Algistatic Level (ppm) | Algicidal Level (ppm) |
|---|---|---|
| NC-2590:Agefloc WT (3:1) | 0.6 | >3 |
| NC-2590:Agefloc WT50SLV (3:1) | 0.6 | >3 |
| NC-2590:Agefloc WT20VHV (3:1) | 0.6 | >3 |
| NC-2590 | 0.6 | >3 |
| Agefloc WT20VHV | 0.6 | >3 |

What is claimed is:

1. A water treatment composition comprising:
   A. a first compound which is a water-dispersible ionene polymer; and
   B. a second compound which is a water-dispersible di-lower-alkyl ammonium halide polymer;
   said first and second compounds being present in the composition in a ratio effective to function as a synergistic algae control agent.

2. The composition of claim 1, where said first compound has the molecular formula:

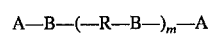

each A moiety is independently selected from:

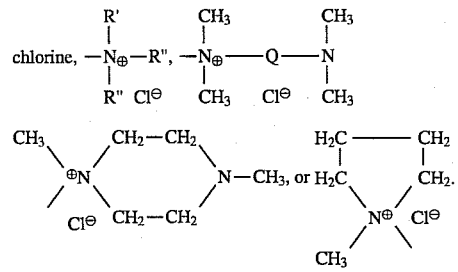

R' is methyl, ethyl, propyl, hydroxyethyl or hydroxypropyl; characterized in that R' and R" are identical when R' is an ethyl, propyl, hydroxyethyl or hydroxypropyl and when R' is methyl, R" is independently methyl or an alkyl group containing 5 to 22 carbon atoms having 0 to 2 carbon to carbon double bonds, cyclohexyl, benzyl or phenyl; further characterized in that R' and R" may form a pyridyl group; each R moiety is independently selected from:

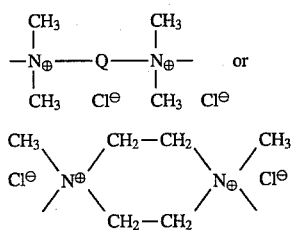

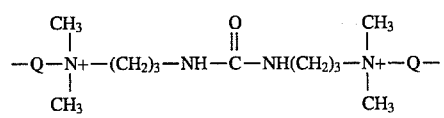

each B moiety is a linkage having the structure:

each Q moiety is independently selected from:

$$-(CH_2)_p-, \quad -CH_2-CH=CH-CH_2-,$$

$$-CH_2-CH_2-O-CH_2-CH_2-,$$

$$-CH_2-CH(OH)-CH_2-, \text{ or}$$

$$-(CH_2)_n-\underset{H}{N}-\underset{\underset{O}{\|}}{C}-\underset{H}{N}-(CH_2)_m-;$$

$$B \text{ is } -CH_2-\underset{OH}{CH}-CH_2-\underset{\underset{R'''}{|}}{\overset{R'''}{\underset{|}{N^\oplus}}}-(CH_2)_n-\quad Cl^\ominus$$

$$-\underset{H}{N}-\underset{\underset{O}{\|}}{C}-\underset{H}{N}-(CH_2)_m-\underset{\underset{R'''}{|}}{\overset{R'''}{\underset{|}{N^\oplus}}}-CH_2-\underset{OH}{CH}-CH_2-\quad Cl^\ominus$$

R''' is a lower alkyl group, m is 0 or a number from 1 to 100, n is 2 or 3, and p varies from 2 to 12.

3. The composition of claim 2, where at least one said A moiety is chloride.

4. The composition of claim 2, where each said A moiety is chloride.

5. The composition of claim 2, where at least one said A moiety is:

$$-\underset{\underset{CH_3}{|}}{\overset{CH_3}{\underset{|}{N_\oplus}}}-Q-\underset{\underset{CH_3}{|}}{\overset{CH_3}{\underset{|}{N}}} \quad Cl^\ominus$$

6. The composition of claim 2, where each said R moiety is $$-\underset{\underset{CH_3}{|}}{\overset{CH_3}{\underset{|}{N_\oplus}}}-Q-\underset{\underset{CH_3}{|}}{\overset{CH_3}{\underset{|}{N_\oplus}}}- \quad Cl^\ominus \quad Cl^\ominus$$

7. The composition of claim 2, where each said Q moiety is: —CH$_2$CH$_2$—O—CH$_2$CH$_2$—.

8. The composition of claim 2, where each said Q moiety is:

$$-CH_2-\underset{OH}{CH}-CH_2-$$

9. The composition of claim 2, where m is zero; one said A moiety is chloride; one said A moiety is:

$$-\underset{\underset{CH_3}{|}}{\overset{CH_3}{\underset{|}{N_\oplus}}}-Q-\underset{\underset{CH_3}{|}}{\overset{CH_3}{\underset{|}{N}}} \quad Cl^\ominus$$

each said R moiety is $$-\underset{\underset{CH_3}{|}}{\overset{CH_3}{\underset{|}{N_\oplus}}}-Q-\underset{\underset{CH_3}{|}}{\overset{CH_3}{\underset{|}{N_\oplus}}}- \quad Cl^\ominus \quad Cl^\ominus$$

and each said Q moiety is

—CH$_2$CH$_2$—O—CH$_2$CH$_2$—.

10. The composition of claim 2, where said first compound has a molecular weight of from about 2000 to about 15,000 amu.

11. The composition of claim 1, where said second compound has the following repeating structure:

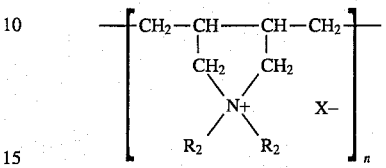

where n is a number between about 10 and about 1000, each R$_2$ is independently selected from methyl and ethyl, and X is a halide ion.

12. The composition of claim 11, where n is from about 18 to about 700.

13. The composition of claim 11, having a molecular weight between about 20,000 and about 100,000 amu.

14. The composition of claim 11, where said X moiety is a chloride ion.

15. The composition of claim 11, where at least one said R$_2$ moiety is methyl.

16. The composition of claim 11, where each said R$_2$ moiety is methyl.

17. The composition of claim 11, having a molecular weight between about 20,000 and about 100,000 amu, said X moiety is chloride, and each said R$_2$ moiety is methyl.

18. The composition of claim 1, where the ratio of said first compound to said second compound is from about 1:10 to about 10:1.

19. The composition of claim 18, where the ratio of said first compound to said second compound is from about 0.5:1 to about 10:1.

20. The composition of claim 18, where the ratio of said first compound to said second compound is from about 1:1 to about 3:1.

21. The composition of claim 1, dispersed at an algistatic concentration in water.

22. The composition of claim 1, dispersed at an algicidal concentration in water.

23. The composition of claim 1, dispersed at a concentration from about 0.05 to about 100 ppm by weight in water.

24. The composition of claim 1, dispersed at a concentration of from about 0.1 to about 10 ppm by weight in water.

25. The composition of claim 1, comprising from about 1% to 100% by weight of the combination of said first and second components and from 0% to 99% water.

26. A method of treating water which is susceptible to the growth of algae by incorporating in said water at least algistatic amount of the composition of claim 1.

27. The method of claim 26, where said at least algistatic amount is an algicidal amount.

* * * * *

UNITED STATES PATENT AND TRADEMARK OFFICE
CERTIFICATE OF CORRECTION

PATENT NO. : 5,529,700

DATED : June 25, 1996

INVENTOR(S) : Kierzkowski et al.

It is certified that error appears in the above-identified patent and that said Letters Patent is hereby corrected as shown below:

Column 1, line 56, delete "W-40" and insert therefor -- WT-40 --.

Column 2, line 8, delete "one" and insert therefor -- One --.

Column 11, line 35, delete "is" and insert therefor -- is: --.

Column 11, line 58, delete "is" and insert therefor -- is: --.

Column 11, line 65, delete "is" and insert therefor -- is: --.

Signed and Sealed this

Second Day of September, 1997

*Attest:*

BRUCE LEHMAN

*Attesting Officer*  *Commissioner of Patents and Trademarks*